(No Model.)
J. F. GREIVE.
HILL PLOW.
No. 507,614.
Patented Oct. 31, 1893.
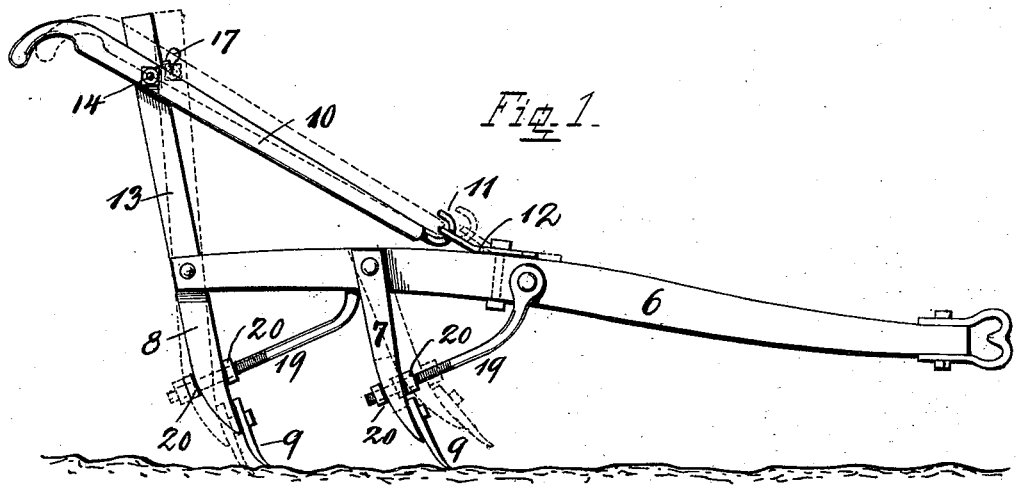
Fig. 1.
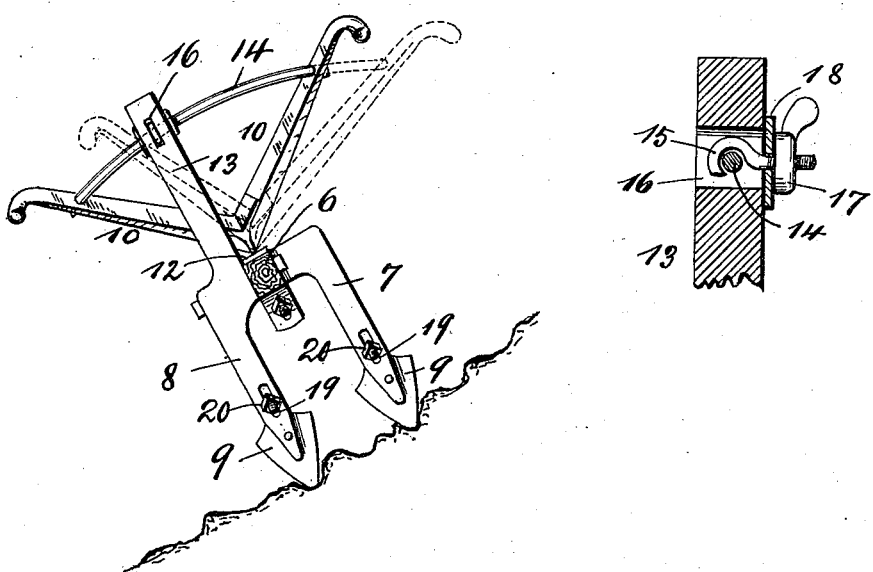
Fig. 2.
Fig. 3.
Attest
Wm. Kramer.
Harry Byrne.
Inventor
John F. Greive
by O. Spengel Atty.

UNITED STATES PATENT OFFICE.

JOHN F. GREIVE, OF CLAY, DEARBORN COUNTY, INDIANA.

HILL-PLOW.

SPECIFICATION forming part of Letters Patent No. 507,614, dated October 31, 1893.

Application filed June 17, 1893. Serial No. 477,981. (No model.)

*To all whom it may concern:*

Be it known that I, JOHN F. GREIVE, a citizen of the United States, and a resident of Clay township, Dearborn county, State of Indiana, have invented certain new and useful Improvements in Hill-Plows; and I do declare the following to be a full, clear, and exact description of this invention, such as will enable others skilled in the art to which it appertains to make and use the same, reference being had to the accompanying drawings, with the reference numerals marked thereon, which form a part of this specification.

This invention relates to plows, cultivators and similar implements intended for use on hill-sides, or inclined ground and the object is to provide a new, simplified and more durable construction for the purpose of support and lateral adjustment of the handles and to make the position of the blades, share, or shovels adjustable, to produce a furrow of more or less depth.

My invention is described and pointed out in the following specification, together with its operation, parts and construction, which latter is also illustrated in the accompanying drawings, in which—

Figure 1, is a side-elevation of my improved hill-plow. Fig. 2, is a rear-view of the same, as it appears when in use on a hill-side and Fig. 3, is a detail-view.

In the drawings, 6, indicates a plow-beam, 7, and 8, the legs connected to it and carrying the blades or shovels. 9, and 10, are the handles. These latter are pivotally attached, by being provided at their junction with a hook 11, which engages with a bearing 12, connected to the plow-beam. For their support an upright 13, is provided, which rises from the rear-end of the plow-beam and has an opening at the proper height through which a bar 14, passes, which unites and supports the two plow-handles. This bar is curved in a manner to permit the handles to swing on their pivotal connection to an extent which the distance between them permits. In plowing on a hillside these handles are adjusted in a manner as shown in dotted lines in Fig. 2, which brings their ends in a horizontal line, or nearly so, permitting the operator behind to assume a natural position, which enables him to manage the plow in the proper manner, especially assisting him to keep the two blades down in the ground, which in case of the upper or higher one is otherwise very difficult. When returning with the plow in the opposite direction, the handles are adjusted to the other side. It is necessary that they should be locked in their adjusted position which may be accomplished in any suitable way. I use a hook 15, occupying a slot 16, provided in upright 13, at a height which enables this hook to engage with bar 14. It has a screw-threaded shank which carries a nut 17, and a washer 18, between the latter and upright 13. For locking, the nut is turned in a manner to cause the hook to move inwardly whereby rod 14, becomes tightly clamped between it and the holes in upright 13, through which it passes.

For the purpose of gaging the depth of the furrows, the position of the blades is made adjustable in a manner to have them more or less inclined to the ground. This is accomplished by having the legs which carry the blades pivotally secured to the plow-beam and held in position by rods 19, also secured to the latter. These rods pass loosely through the legs and carry nuts 20, to either side of them, whereby they may be held in any position. (See dotted lines in Fig. 1.)

For simplicity of construction and stability, leg 8, and upright 13, are made in one piece. Bearing 12, is made longitudinally adjustable on the plow-beam, which is done by providing it with a slot and clamping it in its adjusted position to the plow-beam by means of a bolt 21.

In the drawings, legs 7, and 8, and upright 13, are shown as made of wood. These parts may however be made of iron as well.

Having described my invention, I claim as new—

1. In a plow, or similar implement, when intended for the use designated, the combination with the plow-beam of the handles pivotally secured thereto by an adjustable bearing, a bar 14, which unites the handles, an upright 13, pivotally secured to the plow-beam rising up between the handles, serving as a support for them and forming by its lower continuation a leg 8, a leg 7, both legs adapted to carry the blades or shovels and a lock to hold the handles in their adjusted position.

2. In a plow, or similar implement, when intended for the use designated, the combination with the plow-beam, of the handles pivotally secured thereto, an upright 13, secured also to the plow-beam rising up between the handles, a bar 14, connecting the handles and passing through the upright, a slot 16, in the latter at the point where bar 14, passes through it, the locking-hook 15, occupying this slot and engaging with bar 14, and the lock-nut 17, carried by the locking-hook.

In testimony whereof I affix my signature in presence of two witnesses.

JOHN F. GREIVE.

Witnesses:
C. SPENGEL,
WM. KRAMER.